United States Patent
Havlir et al.

(10) Patent No.: US 10,475,152 B1
(45) Date of Patent: Nov. 12, 2019

(54) DEPENDENCY HANDLING FOR SET-ASIDE OF COMPUTE CONTROL STREAM COMMANDS

(71) Applicant: Apple Inc., Cupertino, CA (US)

(72) Inventors: Andrew M. Havlir, Orlando, FL (US); Jeffrey T. Brady, Orlando, FL (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/896,831

(22) Filed: Feb. 14, 2018

(51) Int. Cl.
*G06T 1/20* (2006.01)
*G06F 12/0891* (2016.01)
*G06F 9/38* (2018.01)

(52) U.S. Cl.
CPC .............. *G06T 1/20* (2013.01); *G06F 9/3855* (2013.01); *G06F 12/0891* (2013.01)

(58) Field of Classification Search
CPC ........................................................ G06T 1/20
See application file for complete search history.

(56) References Cited

U.S. PATENT DOCUMENTS

| | | | |
|---|---|---|---|
| 2013/0002689 A1 | 1/2013 | Panneer et al. | |
| 2014/0099033 A1 | 4/2014 | Natarajan et al. | |
| 2016/0055608 A1 | 2/2016 | Frascati et al. | |
| 2016/0093012 A1* | 3/2016 | Rao | G06T 1/60 345/522 |
| 2016/0180486 A1* | 6/2016 | Rao | G06T 1/20 345/505 |
| 2016/0267622 A1* | 9/2016 | Brothers | G06T 1/20 |
| 2016/0364828 A1 | 12/2016 | Valerio et al. | |
| 2017/0084000 A1 | 3/2017 | Seiler | |
| 2017/0109210 A1* | 4/2017 | Goossens | G06F 8/44 |
| 2017/0300361 A1* | 10/2017 | Lanka | G06F 9/4881 |

* cited by examiner

*Primary Examiner* — Phi Hoang
(74) *Attorney, Agent, or Firm* — Meyertons, Hood, Kivlin, Kowert & Goetzel, P.C.

(57) ABSTRACT

Techniques are disclosed relating to managing dependencies in a compute control stream that specifies operations to be performed on a programmable shader (e.g., of a graphics unit). In some embodiments, the compute control stream includes commands and kernels. In some embodiments, dependency circuitry is configured to maintain dependencies such that younger kernels are allowed to execute ahead of a type of cache-related command (e.g., a command that signals a cache flush and/or invalidate). Disclosed circuitry may include separate buffers for commands and kernels, command dependency circuitry, and kernel dependency circuitry. In various embodiments, the disclosed architecture may improve performance in a highly scalable manner.

20 Claims, 6 Drawing Sheets

DEPENDENCY HANDLING FOR SET-ASIDE OF COMPUTE CONTROL STREAM COMMANDS

BACKGROUND

Technical Field

This disclosure relates generally to graphics processors and more specifically to techniques for processing a compute control stream.

Description of the Related Art

Given their growing compute capabilities, graphics processing units (GPUs) are now being used extensively for large scale compute workloads. APIs such as Metal and OpenCL give software developers an interface to access the compute power of the GPU for their applications. In recent times, software developers have been moving substantial portions of their applications to using the GPU. Furthermore, GPUs are becoming more powerful in new generations. Therefore, designing high performance hardware to execute compute workloads has become more important.

Compute workloads are typically specified at a high level as a compute control stream that includes two main types of objects: kernels and commands. A kernel is a set of work-items to be executed. Commands are generally used for control flow among different kernels.

Figure 1A:
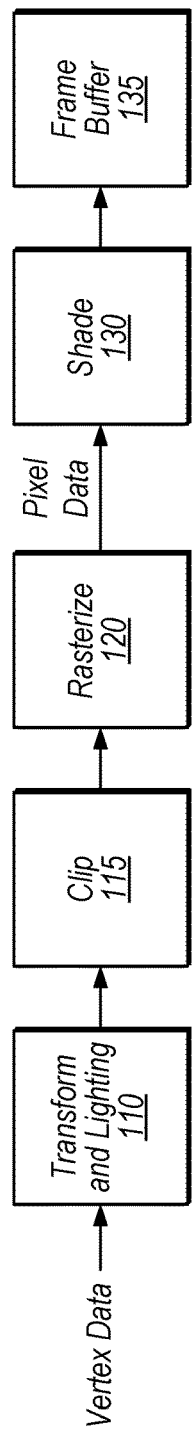
FIG. 1A is a block diagram illustrating an exemplary graphics processing flow.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "shader pipeline configured to process graphics data" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Further, as used herein, the terms "first," "second," "third," etc. do not necessarily imply an ordering (e.g., temporal) between elements. For example, a referring to a "first" graphics operation and a "second" graphics operation does not imply an ordering of the graphics operation, absent additional language constraining the temporal relationship between these operations. In short, references such as "first," "second," etc. are used as labels for ease of reference in the description and the appended claims.

DETAILED DESCRIPTION

Figure 1B:
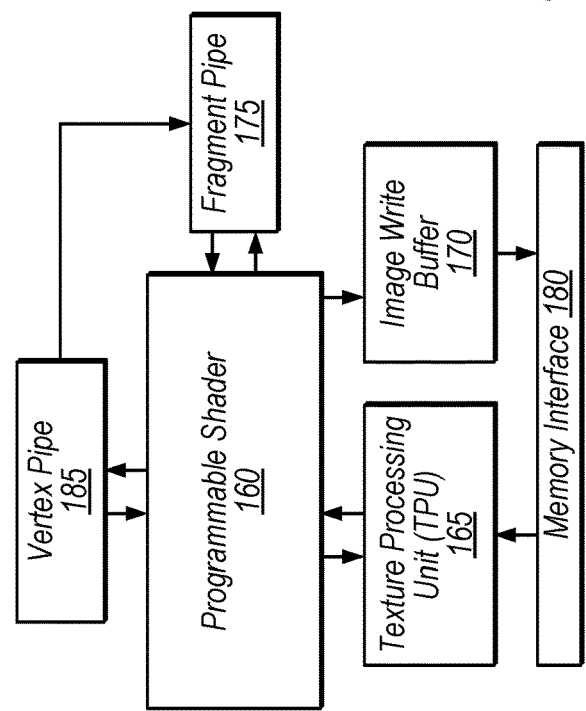
FIG. 1B is a block diagram illustrating one embodiment of a graphics unit.
Figure 2:
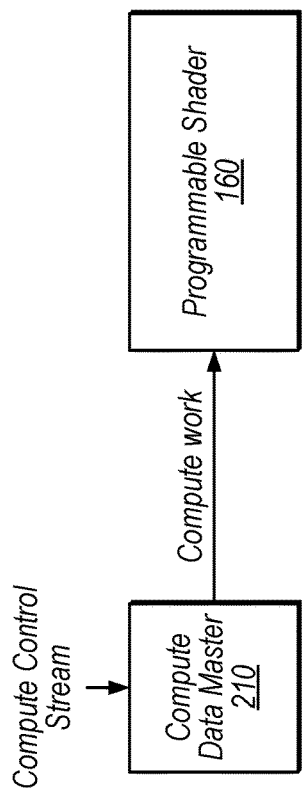
FIG. 2 is a block diagram illustrating an exemplary compute data master.
Figure 3:
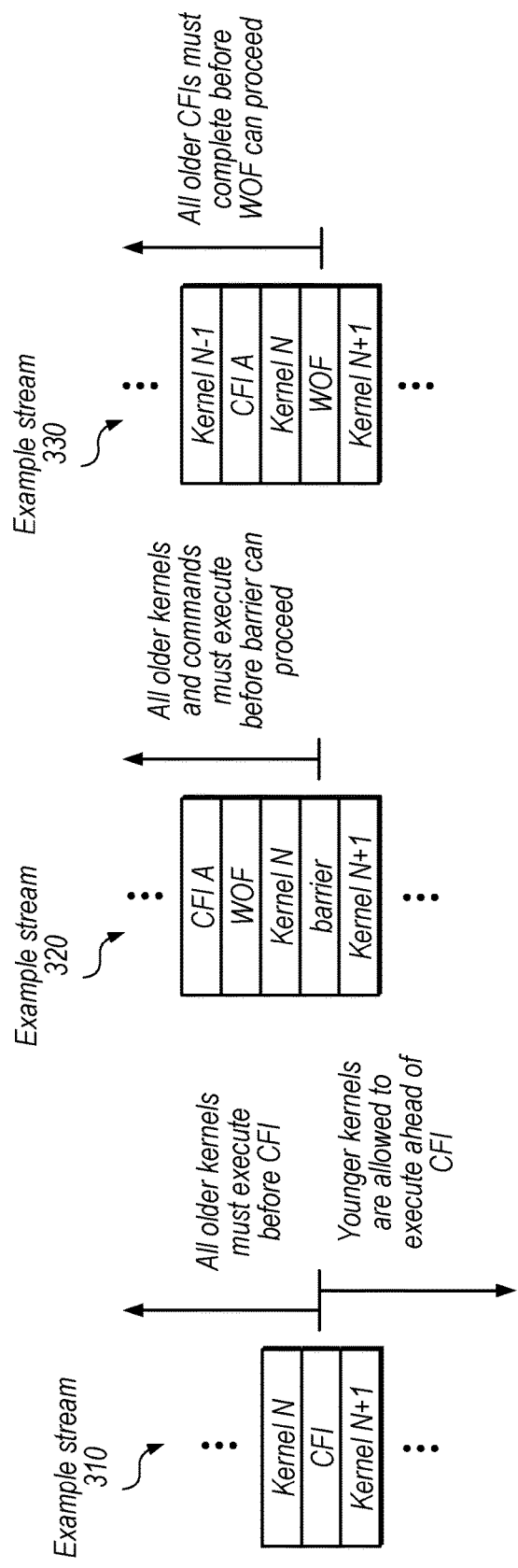
FIG. 3 is a diagram illustrating examples of dependencies for different types of commands, according to some embodiments.
Figure 4:
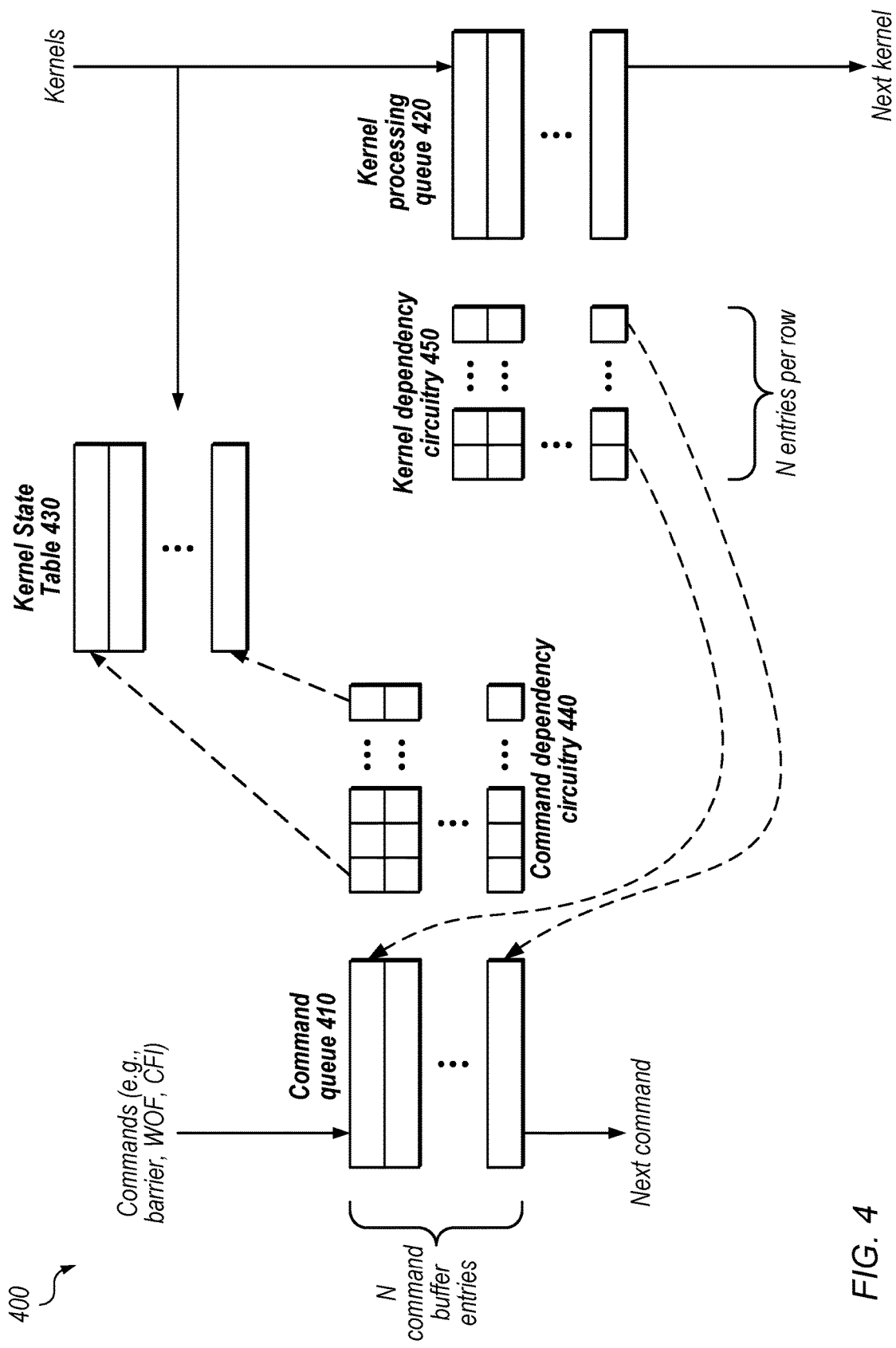
FIG. 4 is a diagram illustrating exemplary dependency circuitry, according to some embodiments.
Figure 5:
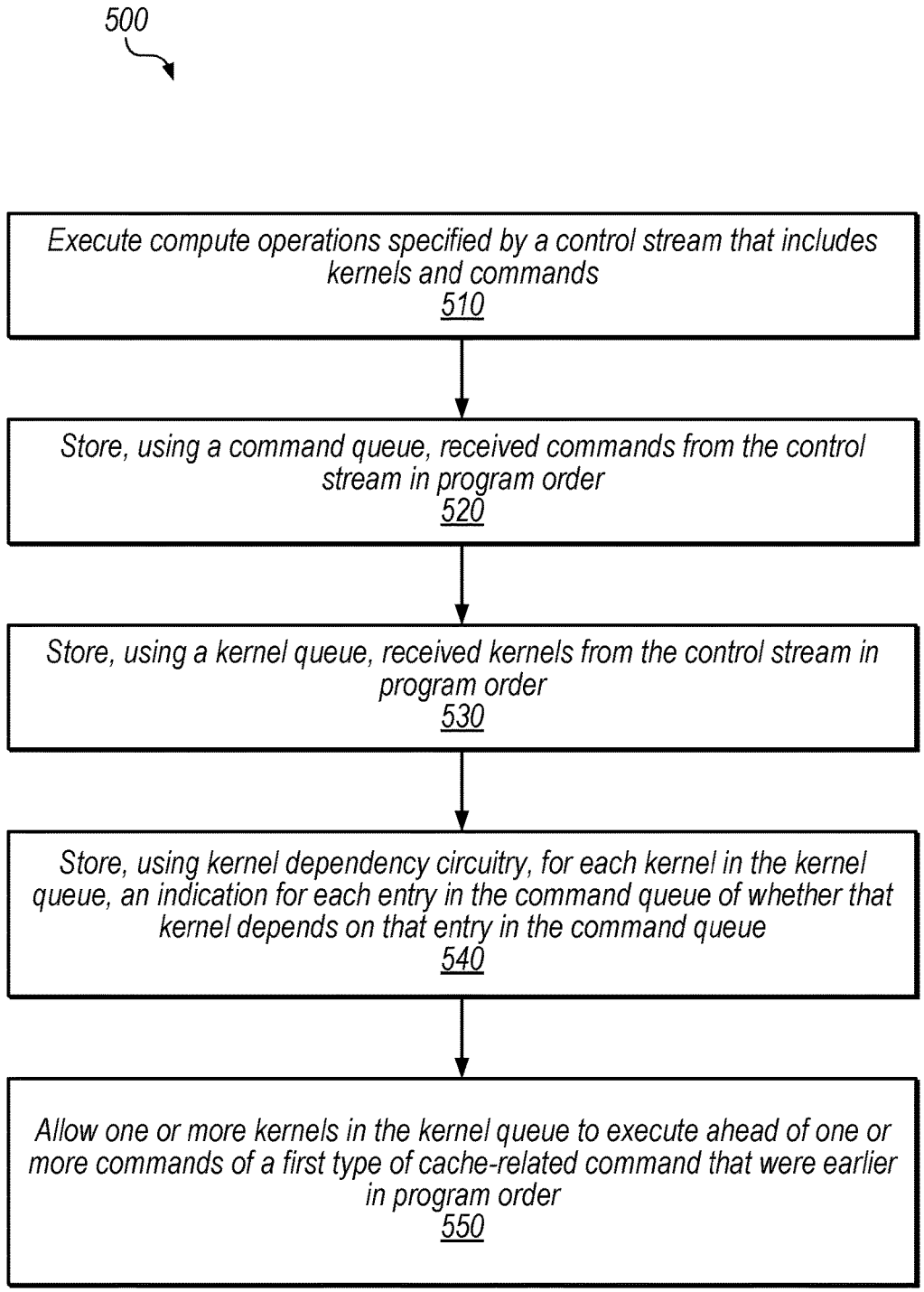
FIG. 5 is a flow diagram illustrating an exemplary method for handling control stream dependencies with CFI set-aside, according to some embodiments.
Figure 6:
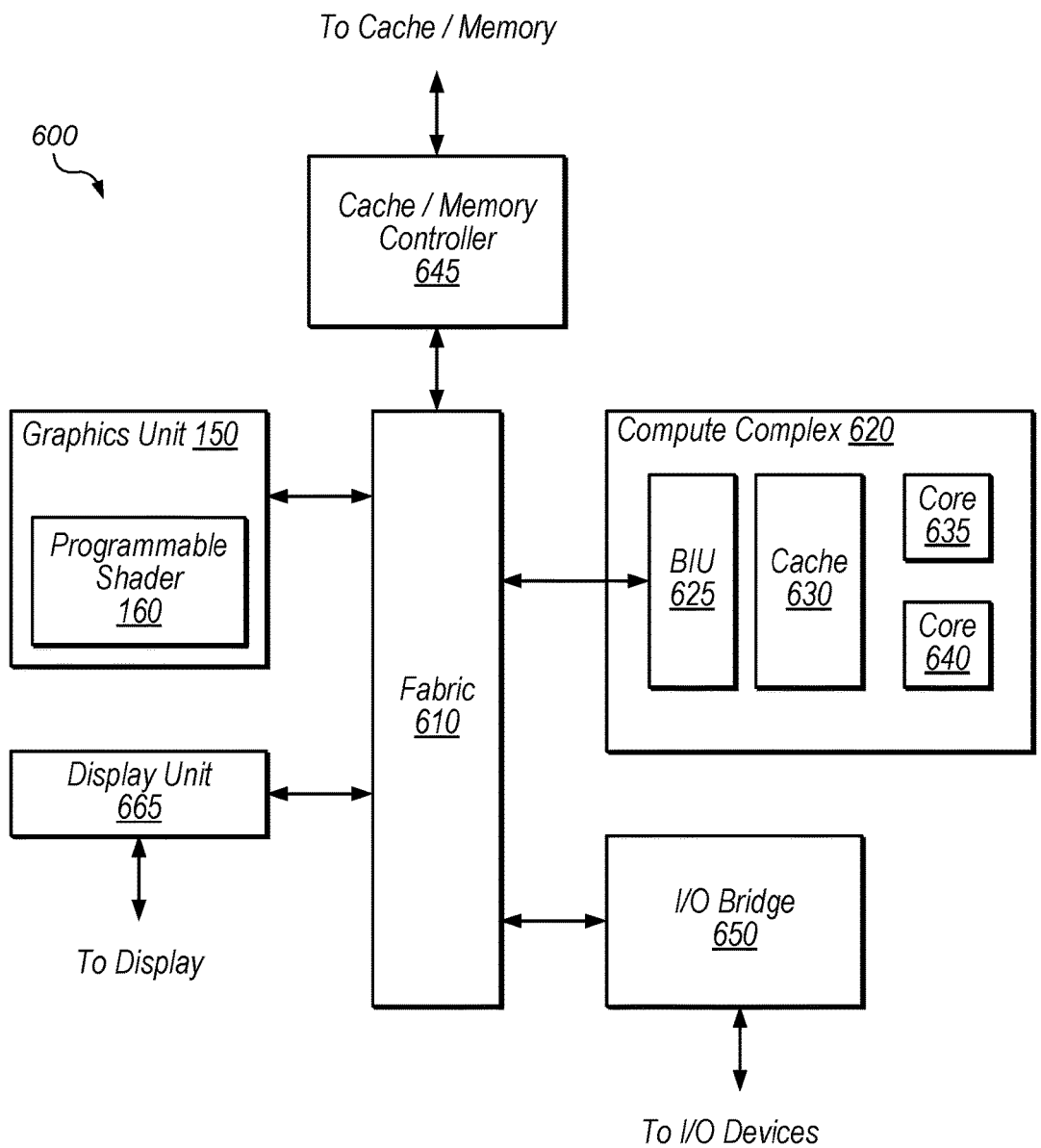
FIG. 6 is a block diagram illustrating one embodiment of a device that includes a graphics unit.
Figure 7:
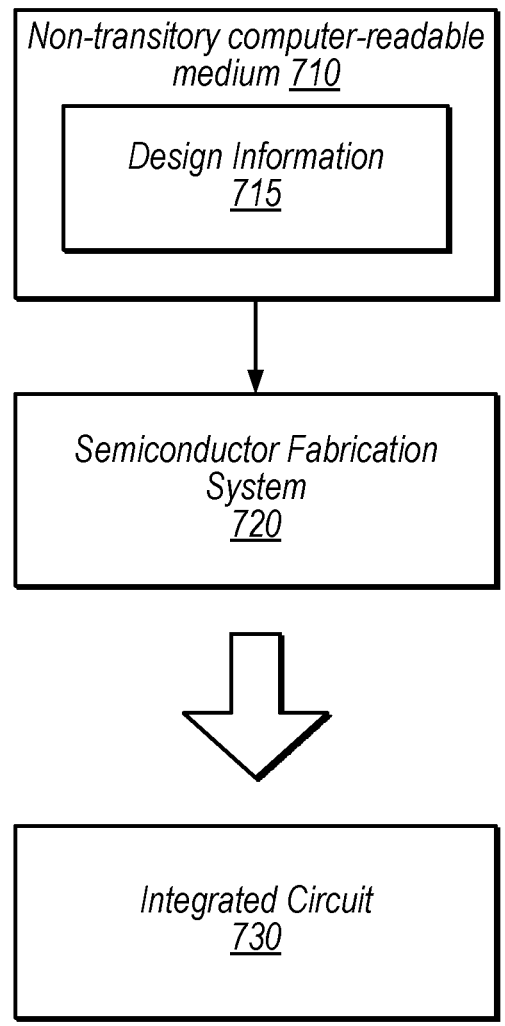
FIG. 7 is a block diagram illustrating an exemplary computer-readable medium, according to some embodiments.

This disclosure initially describes, with reference to FIGS. 1A-1B, a generalized overview of a graphics processing flow and an exemplary graphics unit. FIG. 2 illustrates an exemplary compute data master, FIG. 3 illustrates exemplary compute commands, and FIG. 4 illustrates exemplary dependency circuitry. FIG. 5 illustrates an exemplary method, FIG. 6 illustrates an exemplary device, and FIG. 7 illustrates an exemplary computer-readable medium. In various embodiments, the disclosed techniques may improve performance of a graphics processor by providing a scalable architecture that allows younger kernels to proceed ahead of cache commands such as cache-flush-invalidate (CFI).

Graphics Processing Overview

Referring to FIG. 1A, a flow diagram illustrating an exemplary processing flow 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer) and/or ignoring one or more fragments (e.g., if they are covered by other objects). Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the exemplary steps of FIG. 1A may be performed in various orders, performed in parallel, or omitted. Additional processing steps may also be implemented.

Referring now to FIG. 1B, a simplified block diagram illustrating one embodiment of a graphics unit 150 is shown. In the illustrated embodiment, graphics unit 150 includes programmable shader 160, vertex pipe 185, fragment pipe 175, texture processing unit (TPU) 165, image write unit 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 and/or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 and/or programmable shader 160 to generate fragment data. Vertex pipe 185 and/or fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and/or TPU 165. Programmable shader 160 may be configured to perform vertex processing tasks on vertex data which may include various transformations and/or adjustments of vertex data. Programmable shader 160, in the illustrated embodiment, is also configured to perform fragment processing tasks on pixel data such as texturing and shading, for example. Programmable shader 160 may include multiple execution instances for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

In various embodiments, a programmable shader such as programmable shader 160 may be coupled in any of various appropriate configurations to other programmable and/or fixed-function elements in a graphics unit. The exemplary embodiment of FIG. 1B shows one possible configuration of a graphics unit 150 for illustrative purposes.

Overview and Examples of Compute Control Stream

FIG. 2 is a block diagram illustrating an exemplary compute data master 210 configured to receive a compute control stream and distribute corresponding compute work to various shader units in programmable shader 160 (or multiple programmable shaders, in some embodiments). In some embodiments, arbitration circuitry (not explicitly shown) is configured to arbitrate between different data masters. For example, a pixel data master and a vertex data master may also send work to programmable shader 160 and the arbitration circuitry may assign shader resources to those data masters and to compute data master 210.

In some embodiments, the compute workload is specified in a compute control stream that includes two main types of objects: kernels and commands. A kernel is a set of work-items and/or workgroups, e.g., that include shader instructions to be executed, in some embodiments. Commands are generally used for control flow among different kernels, in some embodiments. Commands may include, without limitation: barrier operations, cache-flush-invalidate (CFI) operations, and wait on flush (WOF) operations. In other embodiments, any of various other types of commands may be implemented; these three exemplary commands are discussed for purposes of illustration but are not intended to limit the scope of the present disclosure.

FIG. 3 is a diagram illustrating exemplary compute control streams and control flow examples for CFI, barrier, and WOF commands, according to some embodiments. In particular, stream 310 includes a CFI, stream 320 includes a barrier, and stream 330 includes a WOF.

CFI commands, in some embodiments, signal a cache flush and/or invalidation, to occur after all prior kernels finish. Therefore, a CFI should wait until all older kernels have been executed before completing (e.g., before actually performing its cache operation), in these embodiments. As shown in example stream 310, however, younger kernels are allowed to execute ahead of a CFI. This may be referred to as "CFI set-aside" and may enable substantial performance scaling, in some embodiments. Note that a CFI may indicate both flush and invalidation, flush only, or invalidation only, depending on data in the CFI. In other embodiments, separate commands may be used for flushes and invalidates. In various embodiments, techniques discussed herein for CFI may be used for various other operations; CFI is discussed for purposes of illustration but is not intended to limit the scope of the present disclosure.

Barriers, in some embodiments, signal that all prior parts of the compute control stream must complete before processing any subsequent parts of the control stream. As shown in example stream 320, for example, the CFI A, WOF, and Kernel N portions of the control stream must complete before anything after the barrier (e.g., Kernel N+1) can proceed.

WOF commands, in some embodiments, signal that all prior CFIs must complete before processing any subsequent parts of the control stream. In example stream 330, for example, Kernel N+1 cannot proceed until CFI A has completed because it is behind the WOF (although note that Kernel N+1 may begin before Kernel N has finished executing, if there is not a dependency between kernels).

In embodiments discussed below, disclosed dependency circuitry is configured to enforce control flow specified by compute control stream commands, while still allowing CFI set-aside. The disclosed processor architecture and circuitry may advantageously improve performance by allowable younger kernels to execute ahead of CFI commands, in various embodiments.

Exemplary Dependency Circuitry

FIG. 4 is a block diagram illustrating exemplary circuitry 400 configured to enforce control flow, according to some embodiments. In some embodiments, circuitry 400 is included in compute data master 210. In the illustrated embodiment, circuitry 400 includes command queue 410, kernel processing queue 420, kernel state table 430, command dependency circuitry 440, and kernel dependency circuitry 450.

As shown, in some embodiments, the compute control stream is split between commands and kernels, with commands stored in command queue 410 in program order and kernels stored in kernel processing queue 420 in program order.

Kernel state table 430, in the illustrated embodiment, is configured to maintain information for each kernel supported by the graphics unit. For example, kernel state table 430 may include $2^N$ entries where N is the number of bits used in kernel identifiers. In some embodiments, each entry includes a bit indicating whether the corresponding kernel is active (e.g., kernels may be considered active when they have been invoked for execution and have not yet completed).

Command dependency circuitry 440, in the illustrated embodiment, includes a row for each entry in command queue 410. Each row, in the illustrated embodiment, includes an entry for each entry in kernel state table 430, as shown by the dashed straight lines in FIG. 4. The entry indicates (e.g., using a single bit, in some embodiments) whether the corresponding entry in the command queue depends on that kernel. In some embodiments, when CFIs and barriers enter the command buffer, entries in a corresponding row of command dependency circuitry 440 are set for all kernels that are active. In some embodiments, when a kernel completes execution, all corresponding entries in a column of circuitry 440 are cleared. In these embodiments, a command is not allowed to proceed until its row in command dependency circuitry 440 indicates that all kernels on which it depends have completed execution. In some embodiments, because WOF commands do not depend on older kernels, dependency entries are not set in circuitry 440 for WOF.

Note that the terms "setting" and "clearing" are used herein to indicate changing an indication, but these actions may correspond to any of various appropriate actual values or polarities. For example, setting may change a bit from 0 to 1 or from 1 to 0. Clearing may change the bit in the opposite direction from setting. In various embodiments, the bit setting and clearing may be performed by control circuitry, which is not explicitly shown in FIG. 4.

Kernel dependency circuitry 450, in the illustrated embodiment, includes a row for each entry in kernel processing queue 410. Each row includes an entry for each entry in command queue 410, as shown by the dashed curved lines in FIG. 4. Thus, the number of columns in dependency circuitry 450 corresponds to the number of command buffer entries, in the illustrated embodiment. When kernels enter the kernel processing queue, entries in their corresponding row of kernel dependency circuitry 450 are set for valid entries in the command queue 410 that store a barrier or WOF. When a command buffer entry completes execution, the bits in the corresponding column of kernel dependency circuitry 450 are cleared. Note that entries are not set, in some embodiments, for queue entries that store CFIs. In some embodiments, this enables CFI set-aside, e.g., because younger kernels will not wait for CFIs if a dependency is not indicated.

In various embodiments, objects may execute from the command queue 410 or the kernel processing queue 420 when they are the oldest object in that storage structure and all their dependencies are cleared. In various embodiments, the circuitry of FIG. 4 provides scalable, high-performance tracking of dependencies and enables CFI set-aside. For example, to increase or decrease the amount of CFI set-aside enabled in different designs, the number of entries in command queue 410 may be increased or decreased.

Exemplary Method

FIG. 5 is a flow diagram illustrating an exemplary method 500 for managing dependencies in a compute control stream, according to some embodiments. The method shown in FIG. 5 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

At 510, in the illustrated embodiment, a processor (e.g., a graphics unit) executes compute operations specified by a control stream that includes kernels and commands. In some embodiments, the kernels specify compute operations to be performed and at least a portion of the commands control flow between the kernels.

At 520, in the illustrated embodiments, the processor uses a command queue to store received commands from the control stream in program order.

At 530, in the illustrated embodiment, the processor uses a kernel queue to store received kernels from the control stream in program order.

At 540, in the illustrated embodiment, the processor uses kernel dependency circuitry (e.g., circuitry 450) to store, for each kernel in the kernel queue, an indication for each entry in the command queue of whether that kernel depends on that entry in the command queue.

At 550, in the illustrated embodiment, the processor allows one or more kernels in the kernel queue to execute ahead of one or more commands of the first type of cache-related command that were earlier in program order. For example, the kernel dependency circuitry may not indicate dependencies for the first type of cache-related command (e.g., a CFI type) in the command queue.

In some embodiments, the processor clears corresponding entries in the kernel dependency circuitry in response to a command completing execution. In some embodiments, the processor allows a kernel to execute in response to its corresponding entries in the kernel dependency circuitry indicating that it is not dependent on any commands in the command queue.

In some embodiments, the processor uses command dependency circuitry (e.g., circuitry 440) to store, for each command in the command queue, an indication for each active kernel of whether that command depends on that kernel. In some embodiments, the processor clears corresponding entries in the command dependency circuitry in response to completion of a corresponding kernel. In some embodiments, the processor allows a command to execute in response to its corresponding entries in the command dependency circuitry indicating that it is not dependent on any active kernels.

In some embodiments, the first type of cache-related command indicates one or more of a cache flush and a cache invalidation.

Exemplary Device

Referring now to FIG. 6, a block diagram illustrating an exemplary embodiment of a device 600 is shown. In some embodiments, elements of device 600 may be included within a system on a chip. In some embodiments, device 600 may be included in a mobile device, which may be battery-powered. Therefore, power consumption by device 600 may be an important design consideration. In the illustrated embodiment, device 600 includes fabric 610, compute complex 620 input/output (I/O) bridge 650, cache/memory controller 645, graphics unit 150, and display unit 665. In some embodiments, device 600 may include other components (not shown) in addition to and/or in place of the illustrated components, such as video processor encoders and decoders, image processing or recognition elements, computer vision elements, etc.

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally.

In the illustrated embodiment, compute complex 620 includes bus interface unit (BIU) 625, cache 630, and cores 635 and 640. In various embodiments, compute complex 620 may include various numbers of processors, processor cores and/or caches. For example, compute complex 620 may include 1, 2, or 4 processor cores, or any other suitable number. In one embodiment, cache 630 is a set associative L2 cache. In some embodiments, cores 635 and/or 640 may include internal instruction and/or data caches. In some embodiments, a coherency unit (not shown) in fabric 610, cache 630, or elsewhere in device 600 may be configured to maintain coherency between various caches of device 600. BIU 625 may be configured to manage communication between compute complex 620 and other elements of device 600. Processor cores such as cores 635 and 640 may be configured to execute instructions of a particular instruction set architecture (ISA) which may include operating system instructions and user application instructions.

Cache/memory controller 645 may be configured to manage transfer of data between fabric 610 and one or more caches and/or memories. For example, cache/memory controller 645 may be coupled to an L3 cache, which may in turn be coupled to a system memory. In other embodiments, cache/memory controller 645 may be directly coupled to a memory. In some embodiments, cache/memory controller 645 may include one or more internal caches.

As used herein, the term "coupled to" may indicate one or more connections between elements, and a coupling may include intervening elements. For example, in FIG. 6, graphics unit 150 may be described as "coupled to" a memory through fabric 610 and cache/memory controller 645. In contrast, in the illustrated embodiment of FIG. 6, graphics unit 150 is "directly coupled" to fabric 610 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In some embodiments, graphics unit 150 is configured to perform one or more of the memory consistency, mid-render compute, local image block, and/or pixel resource synchronization techniques discussed above.

Display unit 665 may be configured to read data from a frame buffer and provide a stream of pixel values for display. Display unit 665 may be configured as a display pipeline in some embodiments. Additionally, display unit 665 may be configured to blend multiple frames to produce an output frame. Further, display unit 665 may include one or more interfaces (e.g., MIPI® or embedded display port (eDP)) for coupling to a user display (e.g., a touchscreen or an external display).

I/O bridge 650 may include various elements configured to implement: universal serial bus (USB) communications, security, audio, and/or low-power always-on functionality, for example. I/O bridge 650 may also include interfaces such as pulse-width modulation (PWM), general-purpose input/output (GPIO), serial peripheral interface (SPI), and/or inter-integrated circuit (I2C), for example. Various types of peripherals and devices may be coupled to device 600 via I/O bridge 650.

Exemplary Computer-Readable Medium

The present disclosure has described various exemplary circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

FIG. 7 is a block diagram illustrating an exemplary non-transitory computer-readable storage medium that stores circuit design information, according to some embodiments. In the illustrated embodiment, semiconductor fabrication system 720 is configured to process the design information 715 stored on non-transitory computer-readable medium 710 and fabricate integrated circuit 730 based on the design information 715.

Non-transitory computer-readable medium 710, may comprise any of various appropriate types of memory devices or storage devices. Medium 710 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Medium 710 may include other types of non-transitory memory as well or combinations thereof. Medium 710 may include two or more memory mediums which may reside in different locations, e.g., in different computer systems that are connected over a network.

Design information 715 may be specified using any of various appropriate computer languages, including hardware description languages such as, without limitation: VHDL, Verilog, SystemC, SystemVerilog, RHDL, M, MyHDL, etc. Design information 715 may be usable by semiconductor fabrication system 720 to fabricate at least a portion of integrated circuit 730. The format of design information 715 may be recognized by at least one semiconductor fabrication system 720. In some embodiments, design information 715 may also include one or more cell libraries which specify the synthesis and/or layout of integrated circuit 730. In some embodiments, the design information is specified in whole or in part in the form of a netlist that specifies cell library elements and their connectivity. Design information 715, taken alone, may or may not include sufficient information for fabrication of a corresponding integrated circuit. For example, design information 715 may specify the circuit elements to be fabricated but not their physical layout. In this case, design information 715 may need to be combined with layout information to actually fabricate the specified circuitry.

Semiconductor fabrication system 720 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 720 may also be configured to perform various testing of fabricated circuits for correct operation.

In various embodiments, integrated circuit 730 is configured to operate according to a circuit design specified by design information 715, which may include performing any of the functionality described herein. For example, integrated circuit 730 may include any of various elements shown in FIGS. 1B, 2, and/or 4. Further, integrated circuit 730 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   programmable shader circuitry configured to perform compute operations based on a control stream that includes kernels and commands;
   command queue circuitry configured to store received commands from the control stream in program order;
   kernel queue circuitry configured to store received kernels from the control stream in program order; and
   kernel dependency circuitry that includes a set of dependency entries for each kernel in the kernel queue, wherein each set of dependency entries includes a dependency entry for each entry in the command queue, wherein the dependency entries each specify whether that kernel depends on that entry in the command queue;
   wherein the kernel dependency circuitry is configured to allow one or more kernels in the kernel queue to execute ahead of one or more commands of a first type of cache-related command that were earlier in program order.

2. The apparatus of claim 1, further comprising:
   command dependency circuitry that includes a set of command dependency entries for each command in the command queue, wherein each set of command dependency entries includes a command dependency entry for each active kernel of the apparatus, wherein the command dependency entries each specify whether that command depends on that kernel.

3. The apparatus of claim 2, wherein the apparatus is configured to clear corresponding entries in the command dependency circuitry in response to completion of a corresponding kernel.

4. The apparatus of claim 3, wherein the apparatus is configured to allow a command to execute when its corresponding entries in the command dependency circuitry indicate that it is not dependent on any active kernels.

5. The apparatus of claim 1, wherein the first type of cache-related command indicates one or more of a cache flush and a cache invalidation.

6. The apparatus of claim 1, wherein the programmable shader circuitry is also configured to perform operations for graphics pixel and vertex tasks.

7. The apparatus of claim 1, wherein the apparatus is configured to clear corresponding entries in the kernel dependency circuitry when a command completes execution.

8. The apparatus of claim 7, wherein the apparatus is configured to allow a kernel to execute when its corresponding entries in the kernel dependency circuitry indicate that it is not dependent on any commands in the command queue.

9. A method, comprising:
   executing, by programmable shader circuitry, compute operations specified by a control stream that includes kernels and commands;
   storing, using a command queue, received commands from the control stream in program order;
   storing, using a kernel queue, received kernels from the control stream in program order; and
   storing, using kernel dependency circuitry that includes a set of dependency entries for each kernel in the kernel queue wherein each set of dependency entries includes a dependency entry for each entry in the command queue, information in one of the sets of dependency entries that specifies, for each entry in the command queue, whether that kernel depends on that entry in the command queue; and
   allowing, by the kernel dependency circuitry, one or more kernels in the kernel queue to execute ahead of one or more commands of a first type of cache-related command that were earlier in program order.

10. The method of claim 9, further comprising:
    storing, using command dependency circuitry that includes a set of command dependency entries for each command in the command queue wherein each set of command dependency entries includes a command dependency entry for each entry in the kernel queue, information in one of the sets of dependency entries that specifies, for each command in the command queue, whether that command depends on that entry in the kernel queue;
    clearing corresponding entries in the command dependency circuitry in response to completion of a corresponding kernel; and
    allowing a command to execute in response to its corresponding entries in the command dependency circuitry indicating that it is not dependent on any active kernels.

11. The method of claim 9, further comprising:
    clearing corresponding entries in the kernel dependency circuitry in response to a command completing execution; and
    allowing a kernel to execute in response to its corresponding entries in the kernel dependency circuitry indicating that it is not dependent on any commands in the command queue.

12. The method of claim 9, wherein the first type of cache-related command indicates one or more of a cache flush and a cache invalidation.

13. A non-transitory computer readable storage medium having stored thereon design information that specifies a design of at least a portion of a hardware integrated circuit in a format recognized by a semiconductor fabrication system that is configured to use the design information to produce the circuit according to the design, including:
    programmable shader circuitry configured to perform compute operations based on a control stream that includes kernels and commands;
    command queue circuitry configured to store received commands from the control stream in program order;
    kernel queue circuitry configured to store received kernels from the control stream in program order; and
    kernel dependency circuitry that includes a set of dependency entries for each kernel in the kernel queue, wherein each set of dependency entries includes a dependency entry for each entry in the command queue, wherein the dependency entries each specify whether that kernel depends on that entry in the command queue;
    wherein the kernel dependency circuitry allows one or more kernels in the kernel queue to execute ahead of one or more commands of a first type of cache-related command that were earlier in program order.

14. The non-transitory computer readable storage medium of claim 13, wherein the design information further specifies that the circuitry includes:
    command dependency circuitry that includes a set of command dependency entries for each command in the command queue, wherein each set of command dependency entries includes a command dependency entry for each active kernel of the circuit, wherein the command dependency entries each specify whether that command depends on that kernel.

15. The non-transitory computer readable storage medium of claim 14, wherein the circuit is configured to clear corresponding entries in the command dependency circuitry in response to completion of a corresponding kernel.

16. The non-transitory computer readable storage medium of claim 15, wherein the circuit is configured to allow a command to execute when its corresponding entries in the command dependency circuitry indicate that it is not dependent on any active kernels.

17. The non-transitory computer readable storage medium of claim 13, wherein the first type of cache-related command indicates one or more of a cache flush and a cache invalidation.

18. The non-transitory computer readable storage medium of claim 13, wherein the programmable shader circuitry is also configured to perform operations for graphics pixel and vertex tasks.

19. The non-transitory computer readable storage medium of claim 13, wherein the circuit is configured to clear corresponding entries in the kernel dependency circuitry when a command completes execution.

20. The non-transitory computer readable storage medium of claim 19, wherein the circuit is configured to allow a kernel to execute when its corresponding entries in the kernel dependency circuitry indicate that it is not dependent on any commands in the command queue.

* * * * *